US008745506B2

(12) United States Patent
Choudhary et al.

(10) Patent No.: US 8,745,506 B2
(45) Date of Patent: Jun. 3, 2014

(54) DATA STRUCTURE MAPPING AND NAVIGATION

(75) Inventors: Bibhu Choudhary, Kondapur (IN); Deepak Achuthan Menon, Gachibowli (IN); Atish Jayantilal Patel, Gachibowli (IN)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 12/708,615

(22) Filed: Feb. 19, 2010

(65) Prior Publication Data
US 2011/0209056 A1 Aug. 25, 2011

(51) Int. Cl.
G06F 3/00 (2006.01)

(52) U.S. Cl.
USPC .......................................................... 715/739

(58) Field of Classification Search
USPC .................................. 715/738, 739, 863, 864
See application file for complete search history.

(56) References Cited

U.S. PATENT DOCUMENTS

| 7,139,800 | B2 | 11/2006 | Bellotti et al. | |
|---|---|---|---|---|
| 7,185,274 | B1 * | 2/2007 | Rubin et al. | 715/205 |
| 7,200,615 | B2 | 4/2007 | Eschbach et al. | 707/104.1 |
| 7,299,406 | B2 | 11/2007 | Schnurr | 715/212 |
| 7,327,349 | B2 * | 2/2008 | Robbins et al. | 345/156 |
| 7,418,660 | B2 | 8/2008 | Hua et al. | 715/234 |
| 8,181,116 | B1 * | 5/2012 | Amacker et al. | 715/760 |
| 2005/0021851 | A1 | 1/2005 | Hamynen | 709/245 |
| 2005/0195221 | A1 | 9/2005 | Berger | 345/660 |
| 2008/0052684 | A1 | 2/2008 | Bowdidge et al. | |
| 2008/0086703 | A1 | 4/2008 | Flynt et al. | |
| 2008/0094369 | A1 | 4/2008 | Ganatra et al. | |
| 2008/0282157 | A1 * | 11/2008 | Day et al. | 715/273 |
| 2009/0064057 | A1 | 3/2009 | Bull et al. | 715/864 |
| 2009/0199130 | A1 | 8/2009 | Tsern et al. | 815/810 |
| 2009/0313574 | A1 | 12/2009 | Shih et al. | 715/781 |
| 2009/0327213 | A1 | 12/2009 | Choudhary | 707/2 |

OTHER PUBLICATIONS

International Search Report and Written Opinion mailed Aug. 31, 2011.
Extended European Search Report and Search Opinion mailed Jan. 8, 2014 in EP 11745079.1, 5 pgs.
Australian Office Action mailed Jan. 22, 2014 in AU 2011218338, 3 pgs.

* cited by examiner

*Primary Examiner* — Thanh Vu
(74) *Attorney, Agent, or Firm* — Rachael Vaughn; Jim Ross; Micky Minhas

(57) ABSTRACT

Embodiments provide navigable and other information to users. In an embodiment, a handheld computing device can be configured to provide a navigable map that includes a number of map list items corresponding to aspects of an underlying data structure. In one embodiment, a process includes displaying a number of linked list items of a navigable list map in a first display portion and displaying a preview of pertinent information associated with an item in a second display portion. Other embodiments are available.

20 Claims, 13 Drawing Sheets

DATA STRUCTURE MAPPING AND NAVIGATION

BACKGROUND

Consumers have many types of mobile computing devices to choose from, including mobile phones, smart phones, personal data assistants (PDAs), and other personal/business computing devices. Advances in computing power and storage capacity continue to enhance a user's experience with handheld devices including advanced graphics, video processing, and communication capabilities. For example, some smart phones allow users to surf the web while communicating with other users, including the communication of text, audio, images, application files, video, etc. Smart phones and other handheld computing devices also allow users to use various applications, such as word processing, e-mail, spreadsheet, and other applications. Processing techniques employ the use of hardware and software to enhance the user experience. However, display areas of many handheld devices are limited due in part to the overall size and configuration of each device.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide navigable and other information to users. In an embodiment, a handheld computing device can be configured to provide a navigable map that includes a number of map list items corresponding to aspects of an underlying data structure. In one embodiment, a process includes displaying a number of linked list items of a navigable list map in a first display portion and displaying a preview of pertinent information associated with an item in a second display portion. Other embodiments are available.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
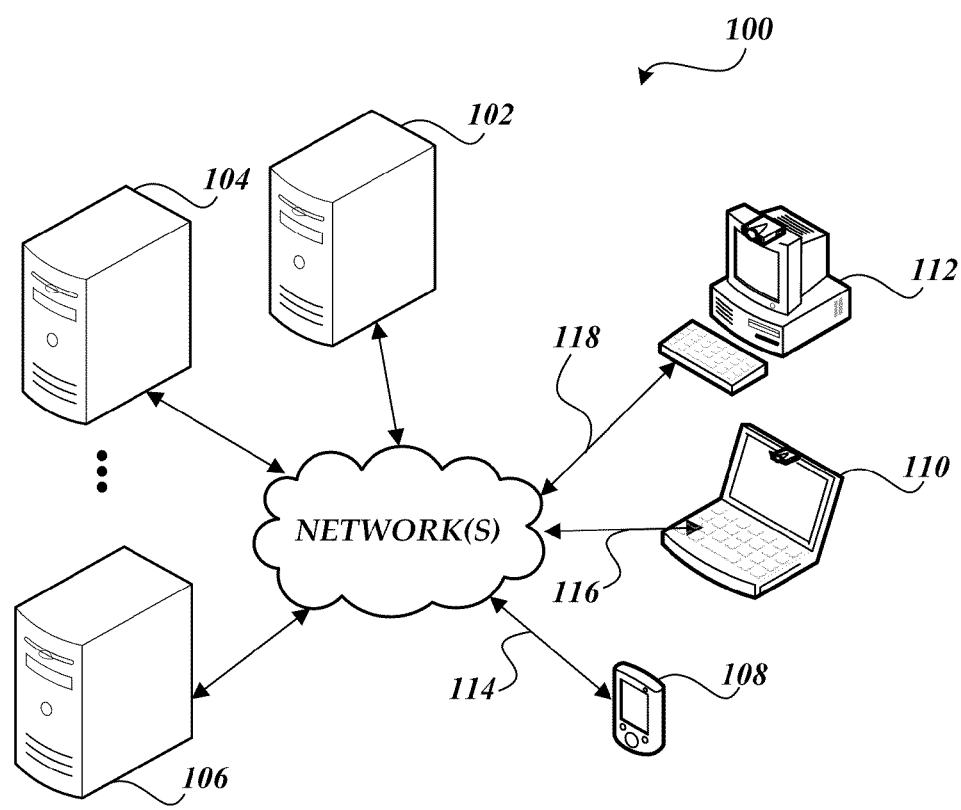
FIG. 1 is a block diagram of an exemplary communication environment.

FIG. 1 is a block diagram of an exemplary communication environment 100. In an embodiment, components of the communication environment 100 operate to provide communication functionality and features to users of the environment 100. As shown, the exemplary communication environment 100 includes a networked association of computing devices/systems and associated communication infrastructure. The environment 100 may include multiple communication networks, server components (e.g., web server 102, collaboration server 104, file server 106, etc.), and/or client devices/systems having various communication functionalities (e.g., smart phone 108, laptop 110, desktop 112, etc.).

As shown by the example of FIG. 1, the smart phone 108 is coupled to the network via communication path 114, laptop 110 is coupled to the network via communication path 116, and the desktop 112 is coupled to the network via communication path 118. It will be appreciated that each path can include a number of communication links, pathways, and/or other components that contribute to providing communication and other functionality to end-users. Exemplary communication environments can include the use of secure networks, unsecure networks, hybrid networks, and/or some other network or combination of networks. By way of example, and not limitation, the environment 100 can include wired media such as a wired network or direct-wired connection, and/or wireless media such as acoustic, radio frequency (RF), infrared, and/or other wired and/or wireless media and components.

Figure 2:
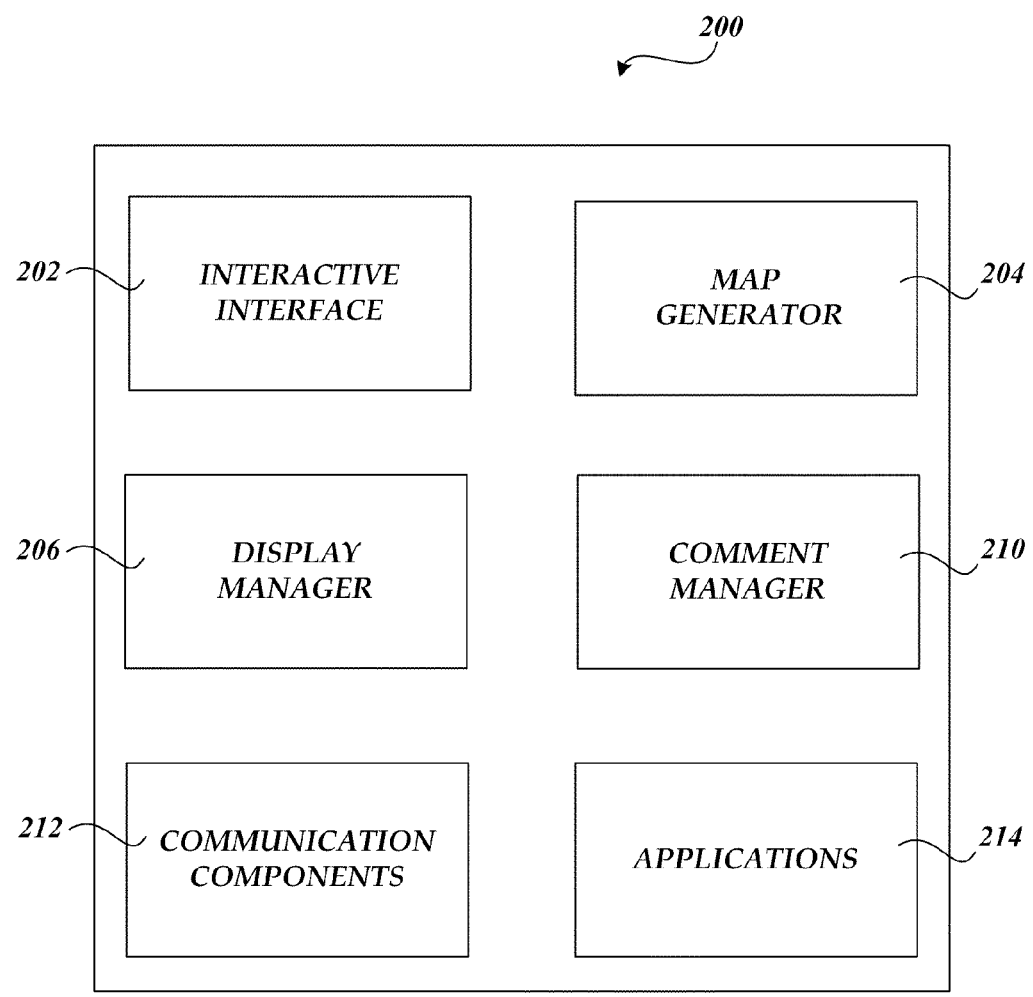
FIG. 2 is a block diagram of an exemplary computing device.

FIG. 2 is a block diagram of an exemplary computing device 200. As shown in FIG. 2, the device of an embodiment includes an interactive interface 202, a map or list generator 204, a display manager 206, a comments manager 210, communication components 212, and applications 214. For example, the device 200 can be configured as a smart phone that includes an interactive touch-based interface and WINDOWS MOBILE application features, such as the VERIZON HTC IMAGIO or the SAMSUNG OMNIA II models of two exemplary handheld computing devices that can be configured to include various functionality and features described herein.

As described below, the interactive interface 202 can be used to generate control inputs as part of providing interactive control, communication and/or other features. For example, a user can use the interactive interface 202 (e.g., tap inputs, stylus inputs, etc.) to open an application to interact with and/or view a file or some portion of a file, such as opening a spreadsheet application, word processing application, presentation application, or some other user application.

In an embodiment, inputs (e.g., user taps, flicks, swipes, etc.) to the interactive interface 202 provide control inputs or commands that cause a called application to open a file or other data construct (e.g., document, spreadsheet, etc.), causing (and calling) the map generator 204 to use a data structure associated with the underlying file or data construct as part of generating a navigable mapping output. In an embodiment, the map generator 204 can operate to generate a navigable mapping output corresponding to a second data structure that includes a navigable map of list items and/or associated mappings. The second data structure can be used as part of presenting and/or navigating aspects of the first data structure.

In one embodiment, the map generator 204 can operate to parse an extensible markup language (XML) data structure as part of generating a navigable list of map items and mappings to elements and/or other parts of an XML data structure that corresponds to an underlying application. For example, spreadsheet files, word processing files, presentation files, and other files can be formatted as XML-based documents which can be parsed as part of identifying and organizing discoverable attributes, including generating mapped or linked data structures.

As examples, the map generator 204 can be used to generate a navigable document map that includes a list of document items and corresponding mappings to document portions, a navigable spreadsheet map that includes a list of spreadsheet items and corresponding mappings to spreadsheet portions, a navigable presentation map that includes a list of presentation items and corresponding mappings to slide portions, etc. In each of these examples, the map generator 204 operates to generate a navigable map output and associated mappings based in part on the underlying application type and/or file type, discussed further below.

A navigable mapping output can be used by the display manager 206 to display all or a portion of the list of map items and/or a preview of a corresponding file or data construct portion (e.g., document content, spreadsheet application parts, slide content, etc.) that is mapped to each item of the list in the device display. For example, the display manager 206 can operate to partition a touch screen to display all or a portion of the list of map items in a first defined area of the touch screen and a preview of a map item of the list in a second defined area (see FIGS. 4-9).

In one embodiment, the display manager 206 can use alpha blending features to provide a semi-transparent overlay that includes all or a portion of a list of map items movably positioned within a first display area of the interactive interface 202. The display manager 206 dynamically updates the interactive interface 202 as the user interacts with the interactive interface 202. For example, the display manager 206 can operate to dynamically update a defined preview portion of touch screen display with a different document part after a user taps a corresponding item of a list of map items.

With continuing reference to FIG. 2, the map generator 204 of one embodiment operates to parse word processing application information, spreadsheet application information, presentation application information, and/or other information to provide a navigable map for each type of application and/or file or other data structure, but is not so limited. For an exemplary word processing application (e.g. WORD application), the map generator 204 can operate to parse a corresponding data structure as part of generating a document map associated with content of the word processing data structure.

In one embodiment, the map generator 204 can operate to generate a document map including automatically generating a text only table of content associated with a select word processing file (e.g., WORD document). For example, the map generator 204 can operate to generate a document map for a word processing document that includes a hierarchal structure of headings, subheadings, sub-subheadings, etc. configured as links or hyperlinks that can be activated to present previews of associated areas or section of the document.

The map generator 204 of one embodiment provides outputs, such that:

1) A maximum of 3 words are displayed for each entry of a generated document map. Hidden text which can be a candidate of a document can be handled as follows:

a) If a word is hidden it can be replaced by the next non-hidden word ((e.g., XML elements: <hiddenword><nonhiddenword1><nonhiddenword2> <nonhiddenword3>—then the entry in the document map is constructed as <nonhidden1><nonhidden2><nonhidden3>) (e.g., XML elements: <nonhiddenword1><hiddenword> <nonhiddenword2><nonhiddenword3>—then the entry in the document map is constructed as <nonhiddenword1><nonhiddenword2><nonhiddenword3>)).

b) Skip an entire section if hidden; and/or c) Skip hidden characters.

2) A document name with an associated file extension can be displayed as the root entry in a document map tree. When the user selects (e.g., taps, clicks, etc.) on the document name of the map, the document is scrolled to the top most page.

3) Entries in the document map can be displayed in the same sequence as they appear in the document.

4) Only text excluding the text inside tables can be considered for generating the document map.

Each entry of a document map of an embodiment can include the following aspects: An entry is textual; an author can indicate that an entry is important to a reader; and/or an author can indicate that an entry is a logical beginning of a section in the document and belongs to a particular level.

The map generator 204 of an embodiment uses a generation algorithm to generate a document map as follows:

1) If the document uses standard heading styles (e.g., Heading 1 to Heading n) or custom styles based on standard heading styles for paragraph formatting, then include the associated document constructs as part of the document map. An entry in the document map can be considered as a child of an immediately preceding higher level heading (e.g., heading1 and heading 2 are higher level headings for heading 3) of a corresponding document. For a top level entry with no immediately preceding higher level heading, the entry will be a child of the "document name" which is the root level entry of the document map.

2) If the document has no standard heading styles or custom styles based on heading styles for paragraph formatting, then operate using the following alternate generation algorithm to generate a document map as follows, but is not so limited:

a) A new line is considered as a start of a section;

b) A font size and style of a first non blank character following a new line can be used to determine if an entry is included as part of a document map using a number of sequentially applied rules, that include, but are not limited to:

1. Ignore the entry if the font size is less than the most frequently used font size in the document. In one embodiment, the most frequently used font size is determined by checking the font size of a first character after a new line;

2. If the font size is the same as the most used font size in the document and the font style used is bold, italic, and/or underline, then mark the entry as a contender for potential inclusion in the document map;

3. If the font size is same as the most used font size in the document, the font style is normal, and the document has a maximum of one font size greater than the most used font size, then mark the entry as a contender for potential inclusion in the document map; and/or 4. If the font size is greater than the most used font size, then mark the entry as a contender for potential inclusion in the document map;

c) For one embodiment, a maximum of 20 entries can be displayed in the generated document map. If the number of contender entries exceeds 20, then display every $n^{th}$ entry in the document map. The value of n is determined by dividing the number of contender entries by 20 and rounding to the nearest small integer. The maximum number of entries are then stored in a registry at <word registry keys>\DocMapMaxEntries. The registry value can be read when a file is loaded; and/or d) All entries in the document map can be set at the same level.

The map generator 204 can also operate to, but is not so limited:

1) Update a document map such that the first three words of a section represented in the document map are present as a corresponding entry in the map;

2) Not update the document map if a section is added, deleted, cut, and/or operations/factors that modify a document map algorithm;

3) The output generated by the map generator 204 can be used by the display manager 206 to automatically scroll to the correct location in the document in the following cases, but is not so limited:

a) If sections represented in the document map are merged; and/or b) If the location of a section represented in the document map is changed due to edits elsewhere in a document;

4) Delete a link in the document map when a corresponding section is deleted or cut;

5) The document map is not persisted and is regenerated every time the user opens a document; and/or 6) If any edits to the document which affect the behavior of the document map are undone, then corresponding changes to the document map are undone.

For an exemplary spreadsheet application (e.g. EXCEL), the map generator 204 can operate to parse a corresponding data structure as part of generating a list of map items associated with a spreadsheet file or other data construct. The map generator 204 of one embodiment can operate to parse an XML spreadsheet document or file to identify associated attributes, content, and other information, such as sheets, tables, graphs, charts, and other data constructs. Unique identifiers (IDs) can be used to discover relevant parts, such as respective worksheets, associated attributes, and names for example. Unique identifiers can also be used to discover any embedded data structures and associated names, such as tables and the table names, charts and the chart names, ranges and the names, graphics and the names, etc.

For example, the map generator 204 can operate to parse an XML-based document to identify certain XML-based tags that represent specific document structures (e.g., tags defining a workbook name, a sheet name, a chart name, table name, etc.). Based in part on the parsing operations, the map generator 204 can generate a list of map items that correspond to the underlying data structure along with the mappings or links used to navigate between the underlying data structure and list.

For an exemplary presentation application (e.g. POWERPOINT), the map generator 204 can operate to parse a corresponding data structure as part of generating a list of map items associated with a presentation file or other data construct. The map generator 204 of one embodiment operates to parse an XML-based presentation document to generate a list of map items and the associated mappings to one or more presentation portions, such as slides, sections, speaker notes, and/or other file portions. For example, the map generator 204 can parse a presentation file to generate a list of map items that include the names of the presentation slides. While a certain number and types of components are described, it will be appreciated that other numbers and types can be included according to various embodiments. For example, component functionality can be further divided or combined with other component functionalities according to desired implementations.

Figure 3:
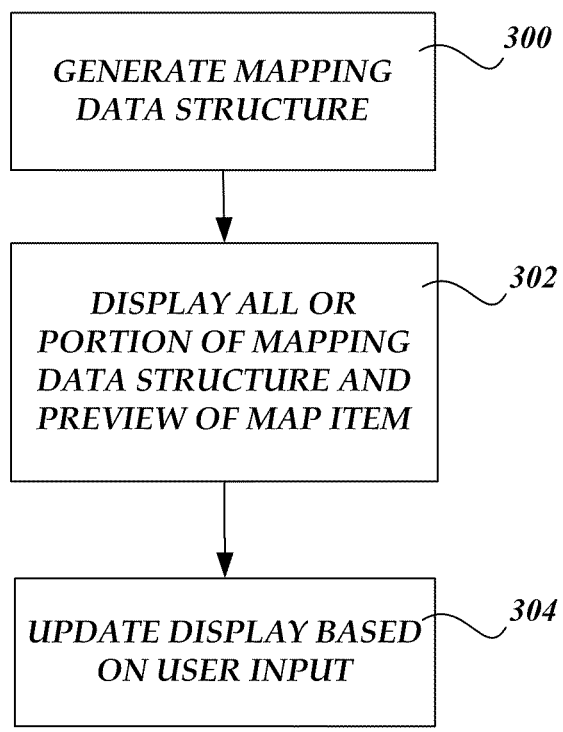
FIG. 3 is a flow diagram depicting an exemplary process of generating and navigating using a data structure mapping.

FIG. 3 is a flow diagram illustrating an exemplary process of providing and displaying a list of mapping items associated with an underlying data structure. For example, the process can use XML-based data structures to generate mapped or linked data structures that include displayable map items and mappings to corresponding portions of underlying data structures. In an embodiment, the process operates to generate a mapped data structure that includes a number of map items as part of displaying a portion of the map items and a preview portion of a map item. At 300, a mapped data structure can be generated based in part on the type of application used to interact with an underlying file, such as a document, spreadsheet, presentation, e-mail, etc. For example, a different parsing algorithm or rule set can be used for each type of application data structure (e.g., word processing file, spreadsheet application file, etc.).

As discussed above, each item of a mapped data structure can be mapped or linked to a corresponding portion of an underlying data structure. A mapped data structure includes the number of identifiable items that can be displayed so that a user can quickly ascertain the relevancy of a particular map item (e.g., file portion), and efficiently navigate to a relevant map item. As examples, a document map can be generated for a word processing document when a user opens the document, a spreadsheet map can be generated for an opened spreadsheet, etc. In alternative embodiments, mapped data structures can be derived before opening some associated file or application. In one embodiment, the mapped data structure is not saved upon closing an associated interactive application associated with the mapping data structure.

At 302, all or a portion of the mapped data structure and/or a preview of a map item can be displayed in a computer display. In an embodiment, depending in part on available screen space, a readable portion of a list of mapping items can be displayed in a first area of a computer display and a sufficient preview of a default or selected list item can displayed in a second area of a computer display. For example, a list of document parts can be displayed in a first portion of a touch screen or other display interface and a preview of a selected part can be displayed in a second portion of the touch screen. In one embodiment, a preview can encompass all or a substantial portion of a display area and the map list can be included as an overlay over a portion of the preview.

At 304, the computer display can be updated based in part on user input. For example, a preview of a different document part can be displayed when a user selects a different map list item. In one embodiment, the user can tap on the preview to view selected item or part using all or a large portion of the computer display or other display which includes hiding or dismissing the list from display. While a certain number and order of operations is described for the exemplary flow of FIG. 3, it will be appreciated that other numbers and orders can be used according to desired implementations.

Figure 4:
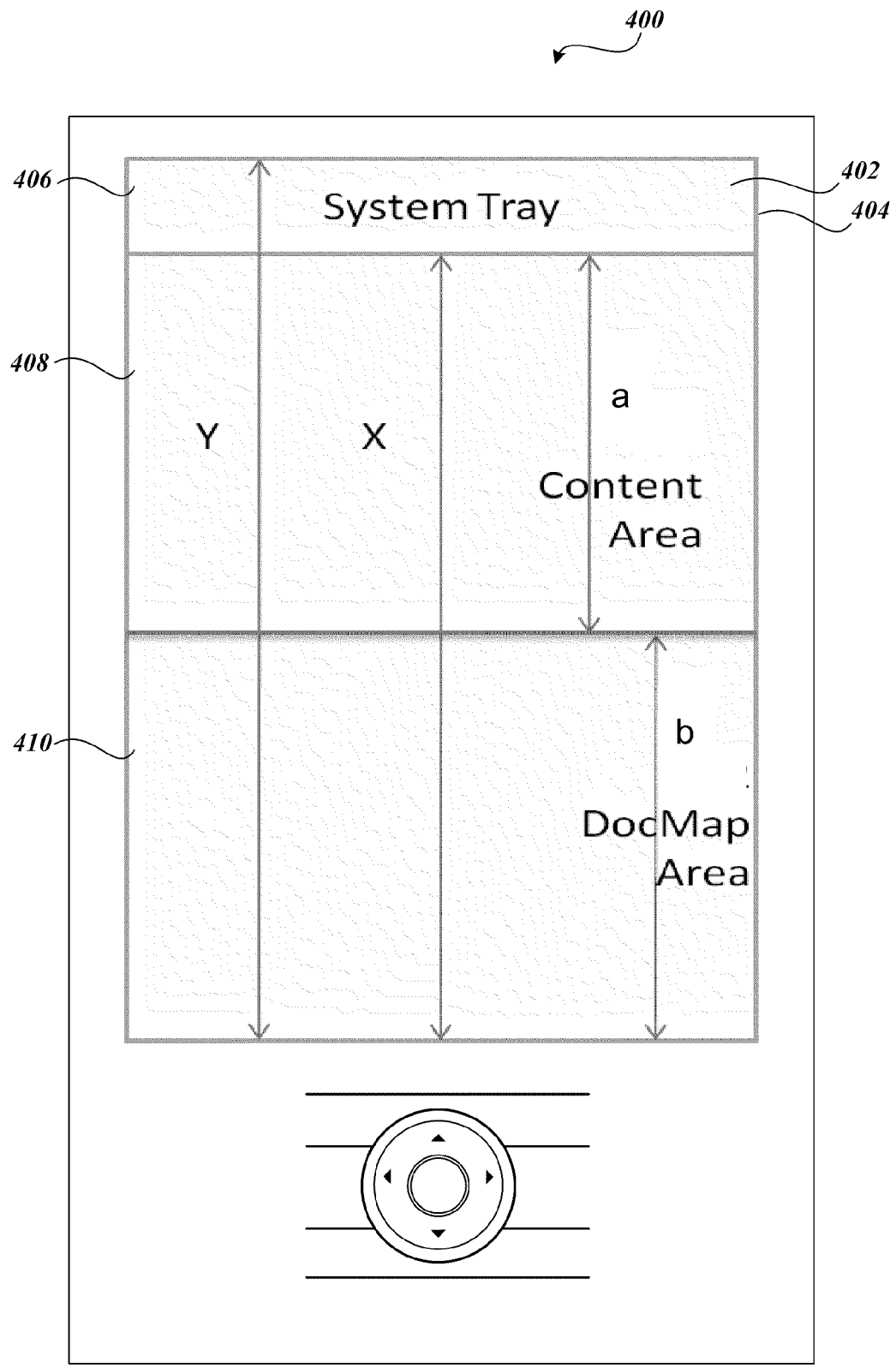
FIG. 4 is a block of an exemplary handheld computing device.

FIG. 4 is a block diagram of an exemplary handheld computing device 400, such as a smart phone using the WINDOWS MOBILE application programs for example. As shown, and according to an embodiment, the viewable area 402 of the display interface 404 is partitioned into a number of display portions 406-410, but is not so limited. For example, a display or window manager can be used to partition the viewable area 402 into distinct partitions that can be rendered to include certain information.

For the example shown in FIG. 4, the viewable area 402 has been partitioned into a first portion 406 to display a system tray, a second portion 408 to display content, and a third portion 410 to display a document map. In one embodiment, the second and third portions are rendered to have approximately the same viewable areas (e.g., dimension "a" is approximately equal or equal to dimension "b" (e.g., a=b=x/2)). As shown in the example of FIG. 4, the second portion 408 is dedicated to display content, and the third portion 410 is dedicated to display list items.

Figure 5A:
FIGS. 5A-5D are block diagrams of features of an exemplary handheld computing device.
Figure 5B:
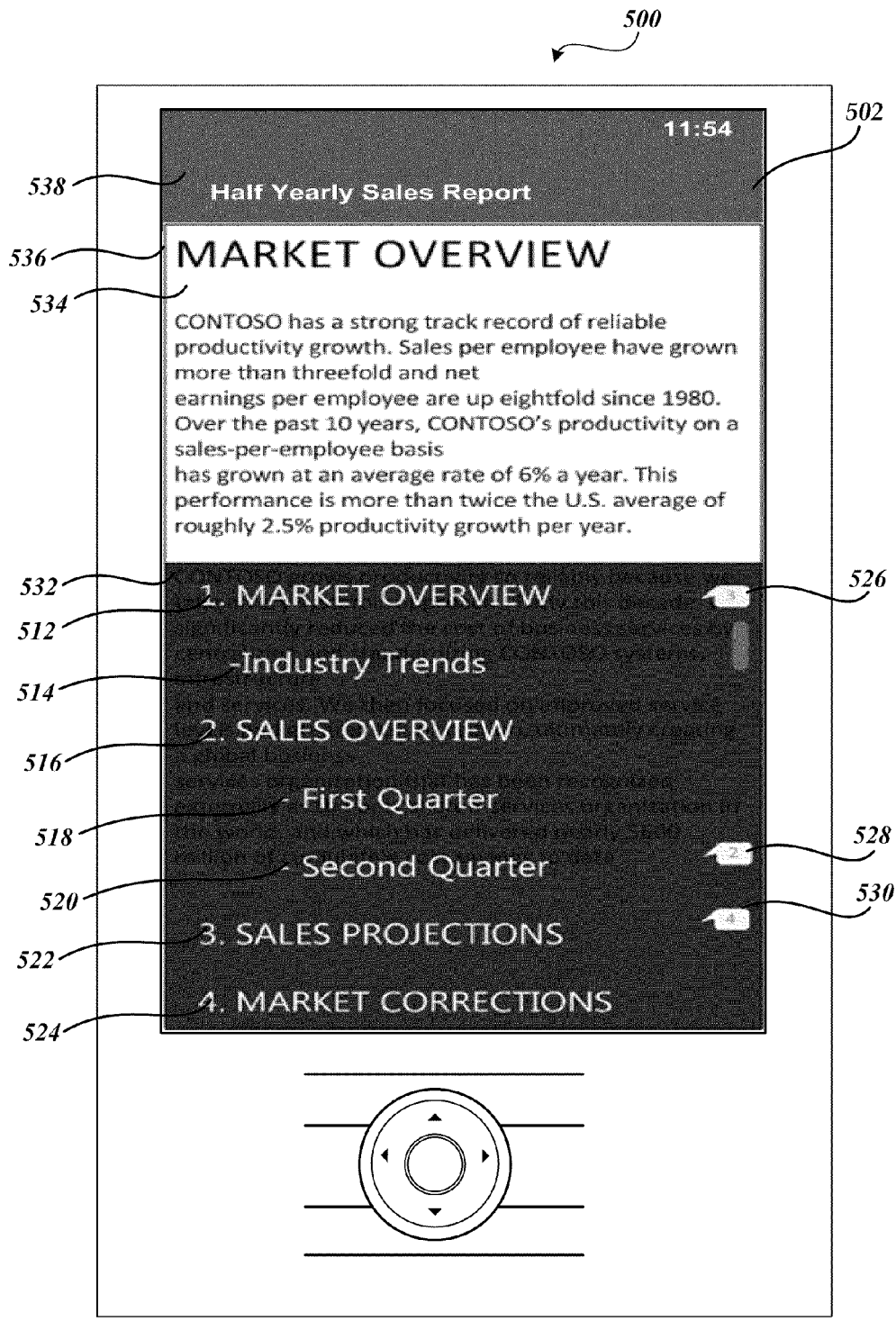
Figure 5C:
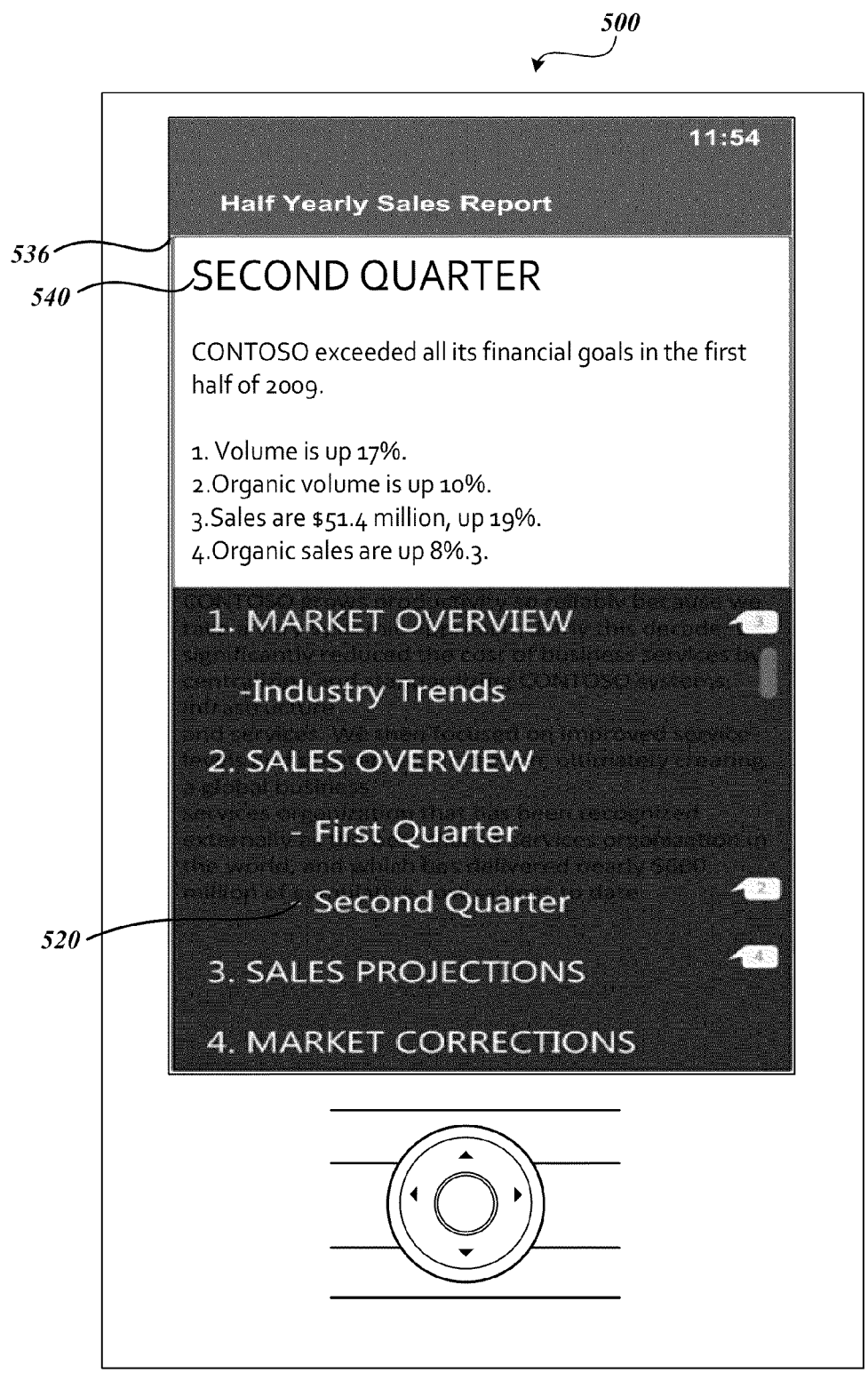

FIGS. 5A-5C are block diagrams depicting various features of an exemplary handheld computing device 500. For example, the device 500 can be configured as a smart phone type that includes various application, communication, and other user features. As shown in FIG. 5A, the device 500 includes a display area 502, a number of interactive tools 504-510, and a displayed portion of an exemplary word processing document.

In one embodiment, map tool 504 operates (e.g., tapping, clicking, etc.) to toggle a mapped data structure that defines a document map that includes a list of linked items for selectively displaying in the display area 502, a comment tool 506 that operates to select, add, delete, modify, and/or view comments, a search tool 508 that operates to search the document map and/or document, and an editing tool 510 that operates to edit portions of the document map and/or document.

In the example of FIG. 5, a user has activated a word processing application and a portion of an exemplary word processing document has been displayed to encompass a substantial portion of the display area 502. As described above, according to one embodiment, a document map can be created for the word processing document before, during, or after opening the word processing application or document, including storing or not storing a map in remote and/or local computer storage areas. In one embodiment, a remote component, such as a serving component for example, can be used to generate a document map.

Referring to FIG. 5B, the display area 502 has been updated to display a number of linked list items 512-524 and associated comments 526-530 in a first portion 532 of the display area 502. In one embodiment, each item can include a mapping or link to a portion of an underlying file or some different file or construct. Each comment symbol can include a number that corresponds with the number of comments associated with a portion of the word processing document and/or list item. In one embodiment, selecting a comment associated with a map list item operates to navigate to the commented portion of the document.

In one embodiment, the number of linked list items 512-524 can be automatically displayed upon opening an application or file. In another embodiment, the map tool 504 can be used to selectively toggle a display or presentation of the number of linked list items 512-524 in the first portion 532. For example, when toggled on, the number of linked list items 512-524 and any associated comments can be displayed over the first portion 532 as a blended or semi-transparent overlay.

As shown, the updated display area 502 includes a preview of content 534 associated with linked list item 512 in a second portion 536 of the display area 502. The list items of one embodiment are configured as links or hyperlinks that, when activated, navigate to a corresponding portion of an underlying word processing document. The display area 502 includes a third portion 538 displaying a title of the document and other information (time, date, etc.).

Figure 5D:
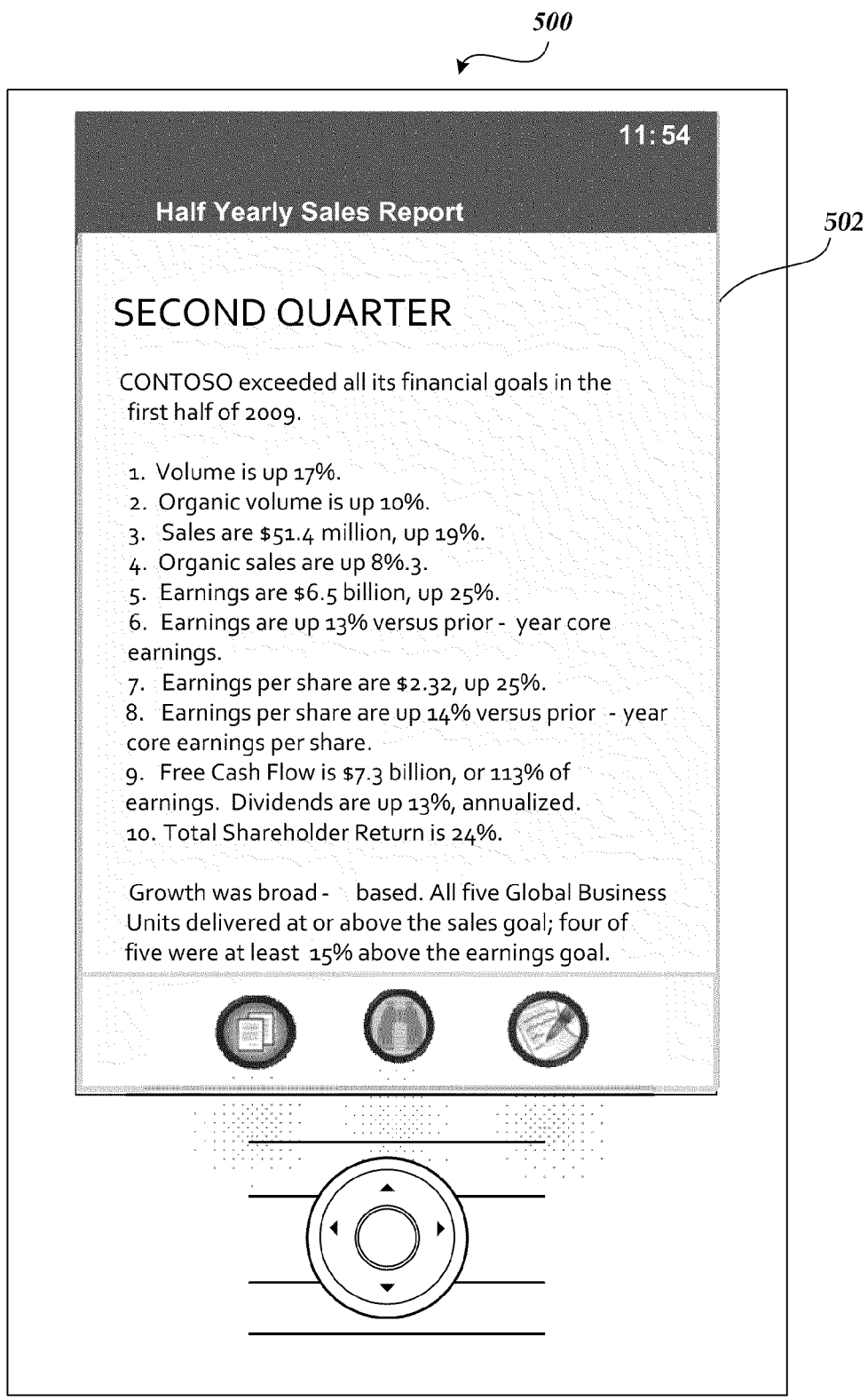

FIG. 5C shows the display area 502 at another instance that includes a preview of content 540 associated with linked list item 520 in the second portion 536 of the display area 502, while continuing to display the number of linked list items 512-524. FIG. 5D shows the display area 502 with a preview portion encompassing all or a substantial portion of the display area 502 at another instance after closing the number of linked list items 512-524. In one embodiment, the number of linked list items 512-524 are automatically hidden or dismissed when a user double taps or selects a preview for full view mode.

Based in part on the type of computing device interactive interface (e.g., touch, audible, keyboard, etc.), a user can interact with the number of linked list items 512-524, any associated comments, and/or information provided in the preview portion. In one embodiment, the following control inputs operate to generate commands that include, but are not limited to:

1) Flick/Pan inputs to navigate linked lists;
2) Tap inputs for a list item to bring a relevant portion in focus;
3) Tap inputs outside the list window to close the list and render a relevant portion in focus; and/or
4) Tap inputs on a comment icon to enter a comment navigation mode.

Table 1 list a number of exemplary control inputs.

TABLE 1

| Gesture/Key | Action |
| --- | --- |
| Flick | Scrolls (including bounce effect when scrolling end) Focus is allowed to move out of display area |
| Pan | Scrolls (including bounce effect when scrolling end) Focus is allowed to move out of display area |
| Tap | Brings focus on the tapped item in the list Corresponding content at the top also changes No op for empty list area. |
| Double Tap | Same as Tap takes user to the content and dismisses the list view |
| Back | dismisses the docmap control |

In one embodiment, upon selecting a comment icon (e.g., tap, click), a control input closes the list and renders an actual document in View Mode including Comment Dialog (e.g., partial screen for comments at bottom, comment bubble beside commented cell, etc.), wherein next and previous buttons can be used to navigate to next and previous comments.

Figure 6:
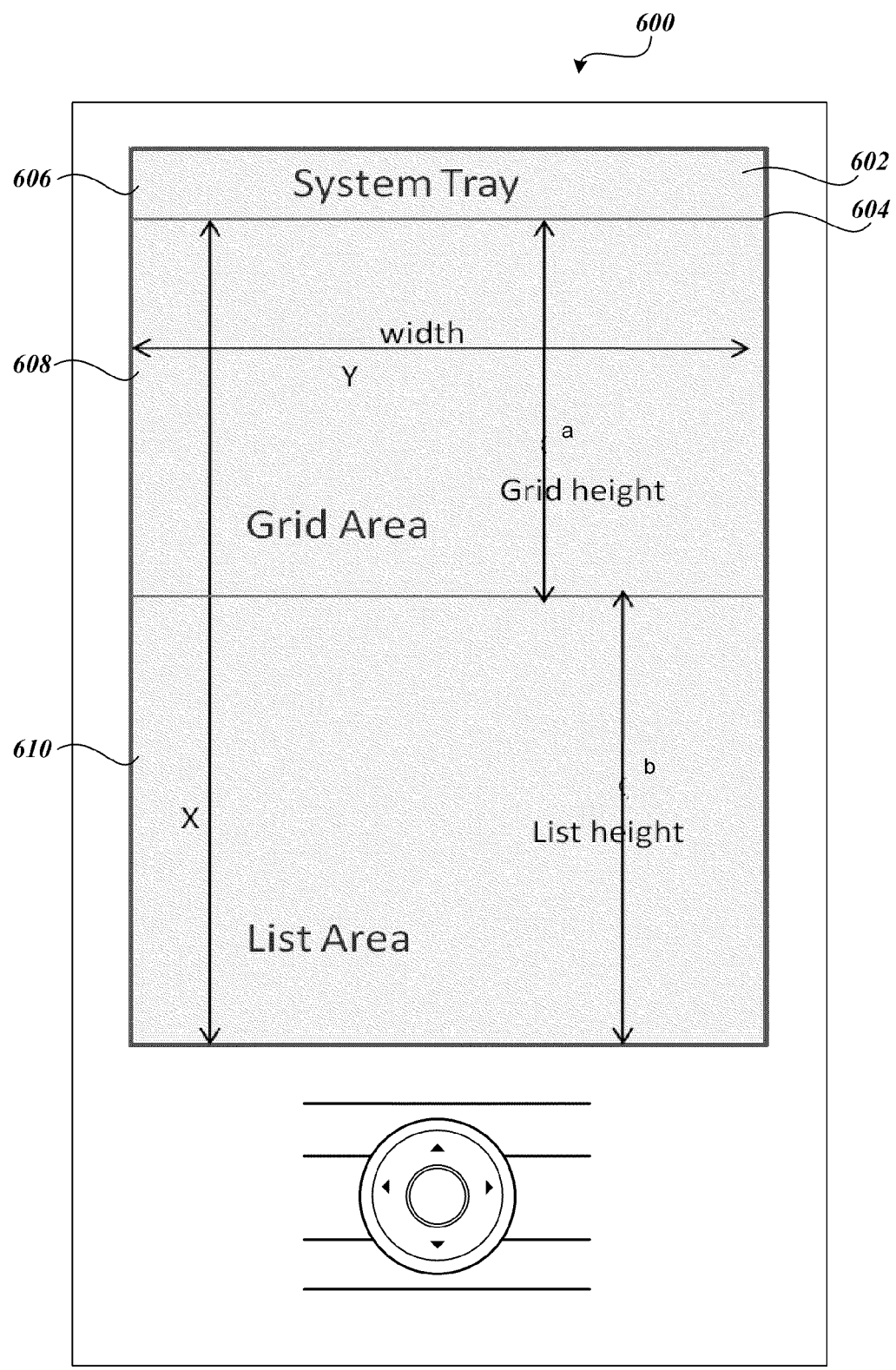
FIG. 6 is a block diagram of an exemplary handheld computing device.

FIG. 6 is a block diagram of an exemplary handheld computing device 600. As shown, and according to an embodiment, the viewable area 602 of the display interface 604 is partitioned into a number of display portions 606-610, but is not so limited. For example, a display manager can be used to partition the viewable area 602 into distinct partitions that can be rendered to include certain information. For the example shown in FIG. 6, the viewable area 602 has been partitioned into a first portion 606 to display a system tray, a second portion 608 to display content, and a third portion 610 to display a map or link list. In one embodiment, the second and third portions are rendered to have approximately the same viewable areas. As shown in for the example device 600 of FIG. 6, the second portion 608 is dedicated to display grid information, and the third portion 610 is dedicated to display list items.

Figure 7:
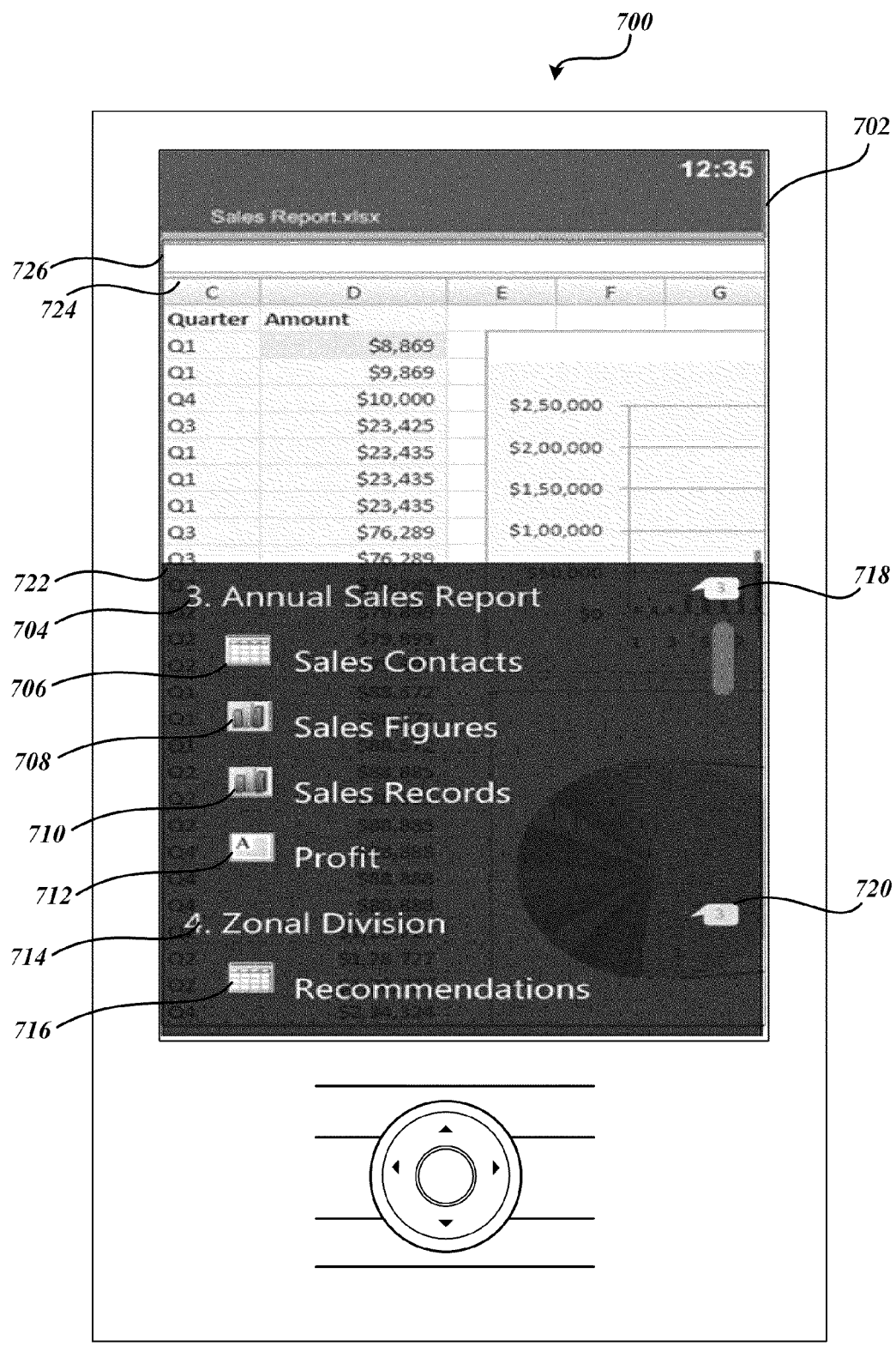
FIG. 7 is a block diagram of features of an exemplary handheld computing device.

FIG. 7 is a block diagram depicting aspects of an exemplary handheld computing device 700 that includes a display area 702 displaying a number of linked list items 704-716 and associated comments 718 and 720 in a first portion 722 of the display area 702. Each comment symbol can include a number that corresponds with the number of comments associated with a portion of a spreadsheet application data structure and/or list item. In one embodiment, selecting a comment operates to navigate to a commented portion. For example, when toggled on, the number of linked list items 704-716 and any associated comments can be displayed over the first portion 722 as a blended or semi-transparent overlay.

As shown, the display area 702 includes a preview of content 724 associated with the linked list item 706 in a second portion 726 of the display area 702. The list items of one embodiment are configured as links or hyperlinks that, when activated, navigate to a corresponding portion of an underlying spreadsheet application data structure. The display area 702 includes a third portion 728 displaying a title of the file and other information (time, date, etc.). Based in part on the type of computing device interactive interface (e.g., touch, audible, keyboard, etc.), a user can interact with the number of linked list items 704-716, any associated comments, and/or information provided in the preview portion.

In one embodiment, the following control inputs operate to generate commands that include, but are not limited to:

1) Flick/Pan inputs to navigate map lists;
2) Tap inputs for a list item to bring a relevant section/part in focus;
3) Double tap inputs for a list item to render main grid view;
4) Tap inputs for a grid part of the screen to return to main grid view; and/or
5) Tap inputs on comments icon to navigate to a comment.

Table 2 list a number of exemplary control inputs.

TABLE 2

| Gesture/Key | Action |
| --- | --- |
| Flick | Scrolls (including bounce effect at scrolling end) Focus is allowed to move out of display area |
| Pan | Scrolls (including bounce effect at scrolling end) Focus is allowed to move out of display area |
| Tap | Brings focus on the tapped item in the list Corresponding grid updated in preview No op for the empty list area. (empty area below last list item) If tap is done on a selected item (currently in focus) in the list, then corresponding grid is shown as preview and the linked list is dismissed Tapping anywhere other than the linked list (e.g., formula bar, grid, or the comment window) operates to dismiss the linked list display Tapping a comment anchor cell operates to display a comment window |
| Double Tap | Transitions to single cell selected mode with the current cell in focus and displayed at the top (similar to list fading away and grid taking its place) |
| Back | Transitions to original calling view in the same state |

In an embodiment, a grid can be displayed at an original zoom level of a calling screen at 100% zoom level when the current item in focus is clicked. Sheet area in focus can be the same as the sheet area that is brought to focus when user taps in the linked list to navigate to an area where freeze pane is applied (with part of the screen covered by all or a portion of the linked list). In one embodiment, a workbook is not displayed as a linked item and Global Name ranges (defined names scoped at workbook level) can be displayed at the end of a list below a last sheet with indentation at the sheet level. Tap and double tap inputs can be used to navigate to a first comment on a sheet and dismiss or exit a linked list, wherein other gestures on a comments icon can be treated as gestures on the linked list.

Figure 8:
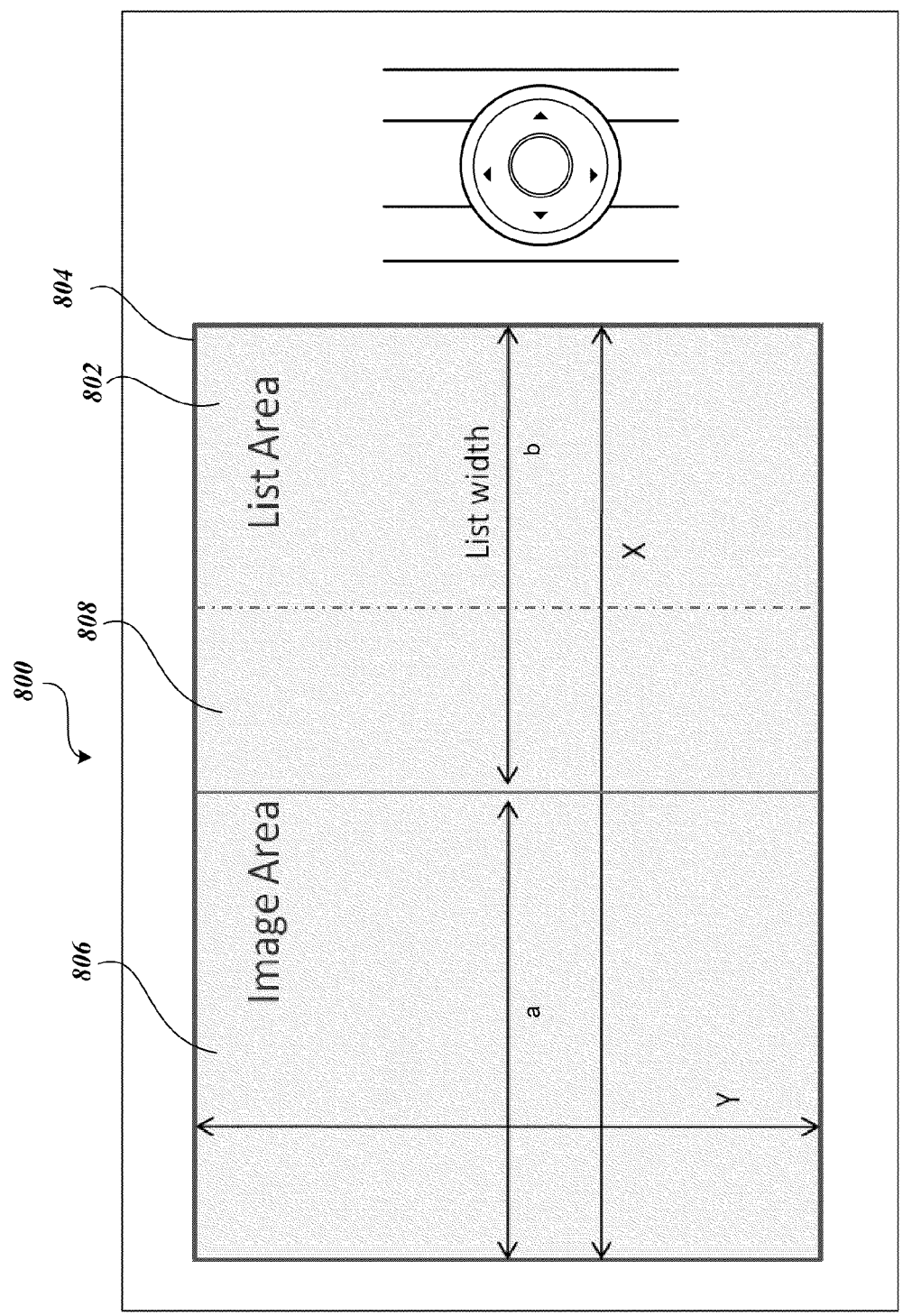
FIG. 8 is a block diagram of an exemplary handheld computing device.

FIG. 8 is a block diagram of an exemplary handheld computing device 800 rotated to a landscape orientation. As shown, and according to an embodiment, the viewable area 802 of the display interface 804 is partitioned into a number of display portions 806 and 808, but is not so limited. For example, a display manager can be used to partition the viewable area 802 into distinct partitions that can be rendered to include certain information. For the example shown in FIG. 8, the viewable area 802 has been partitioned into a first portion 806 to display an image portion and a second portion 808 to display a map list. In one embodiment, the portions are rendered to have approximately the same viewable areas (e.g., dimension "a" is approximately equal to dimension "b").

Figure 9:
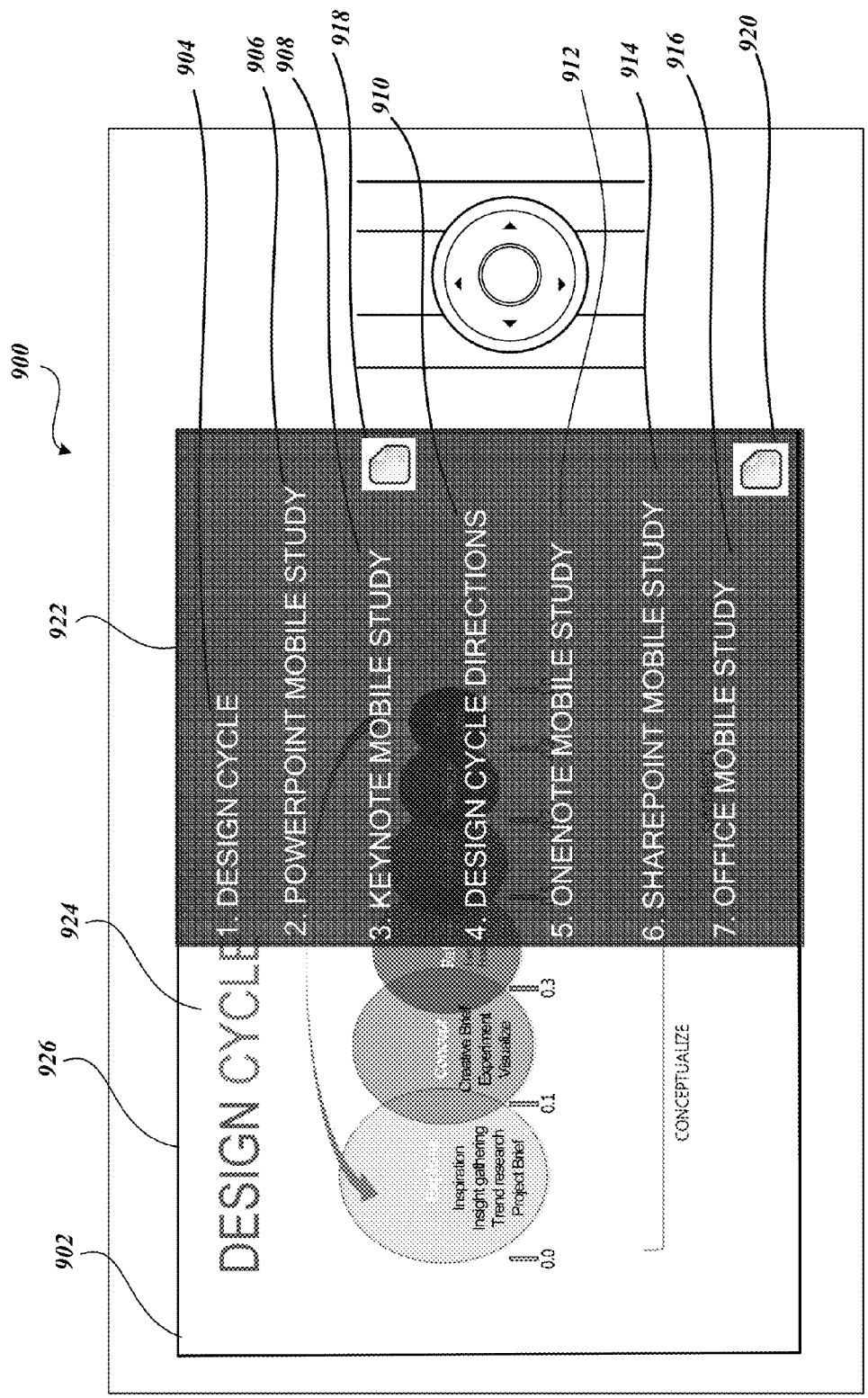
FIG. 9 is a block diagram of features of an exemplary handheld computing device.

FIG. 9 is a block diagram depicting aspects of an exemplary handheld computing device 900 that includes a display area 902 displaying a number of linked list items 904-916 and associated speaker notes 918 and 920 in a first portion 922 of the display area 902. In one embodiment, selecting a note operates to navigate to the noted portion. For example, when toggled on, the number of linked list items 904-916 and any associated speaker notes can be displayed over the first portion 922 as a blended or semi-transparent overlay. As shown, the display area 902 includes a preview of a slide 924 associated with the linked list item 904 in a second portion 926 of the display area 902. The list items of one embodiment are configured as links or hyperlinks that, when activated, navigate to a corresponding portion of an underlying presentation application data structure.

Based in part on the type of computing device interactive interface (e.g., touch, audible, keyboard, etc.), a user can interact with the number of linked list items 904-916, any associated notes, and/or information provided in the preview portion. In one embodiment, the following inputs operate to generate control inputs that include, but are not limited to:

1) Flick/Pan inputs to navigate across slide titles;
2) Tap inputs on a slide title to bring it to top and bring slide image in focus;
3) Tap inputs on a selected list item on a slide to take user to Slide Show;
4) Tap inputs on the slide Preview to take user to Slide Show; and/or
5) Tap inputs on notes icon to take user to speaker notes.

Table 3 list a number of exemplary control inputs.

TABLE 3

| Gesture/Key | Action |
| --- | --- |
| Flick | Scrolls (including bounce effect at scrolling end) Focus is allowed to move out of display area |
| Pan | Scrolls (including bounce effect at scrolling end) Focus is allowed to move out of display area |
| Tap | Brings focus on the tapped item in the list Corresponding slide image rendered in preview No op for the empty list area. (empty area below last list item) If tap is done on a selected item (currently in focus) in the list, then transition to slide show for the slide Tapping a speaker note to display the note |
| Back | Transitions to slide show on original slide |

In addition to computing systems, devices, etc., various embodiments can be implemented as a computer process (e.g., a method), an article of manufacture, such as a computer program product or computer readable media, computer readable storage medium, and/or as part of various communication architectures. An exemplary computer program product can include computer storage media that includes useable control and/or communication instructions/features.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, back-end networks, etc.

Client computing devices/systems and servers can be any type and/or combination of processor-based devices/systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 10:
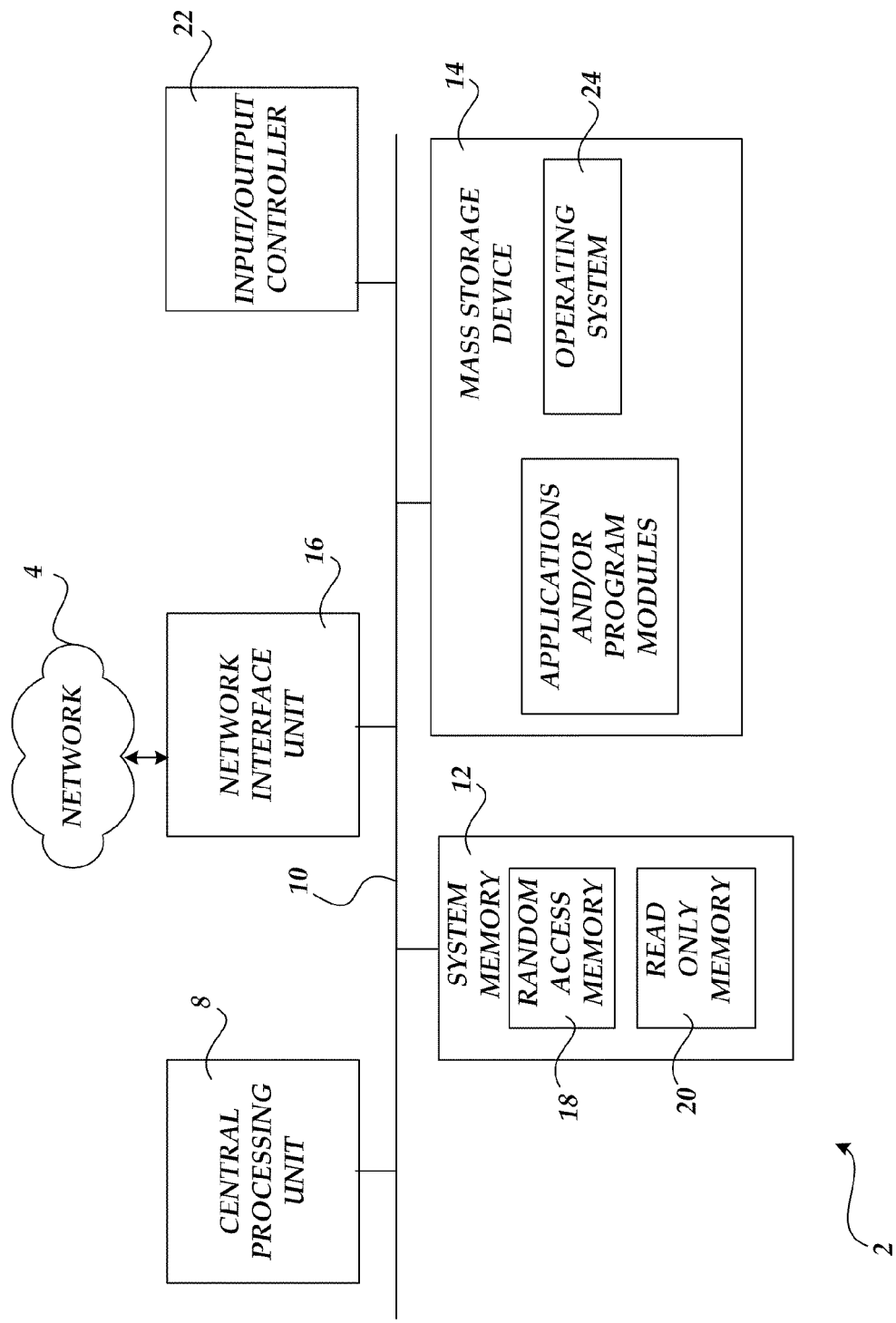
FIG. 10 is a block diagram illustrating an exemplary computing environment for implementation of various embodiments described herein.

Referring now to FIG. 10, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 10, an illustrative operating environment for embodiments of the invention will be described. As shown in FIG. 10, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
executing a client application as part of interacting with an underlying data structure;
generating a navigable map that includes map list items comprising textual information identifying parts of the underlying data structure, further including generating the navigable map of the map list items based in part on a type of application, wherein each map list item maps to associated content of the type of application;
displaying a list of the map list items comprising the textual information of the navigable map in a first display portion of a handheld display while also displaying a preview of information of a first portion of a file associated with a map list item in a second display portion of the handheld display; and
dynamically updating the second display portion of the handheld display with a preview of a second portion of the file after selecting a different map list item of the list of map list items while continuing to display the list of map list items in the first display portion of the handheld display.

2. The method of claim 1, further comprising parsing the data structure to generate the map based in part on a type of the client application that operates with the underlying data structure, the method operable to generate different map types of textual information including:
a navigable document map of document items to display in the first display portion and corresponding mappings to document portions;
a navigable spreadsheet map that includes a list of spreadsheet items to display in the first display portion and corresponding mappings to spreadsheet portions; and
a navigable presentation map that includes a list of presentation items to display in the first display portion and corresponding mappings to presentation portions.

3. The method of claim 2, further comprising parsing the data structure based in part on a word processing application mapping, spreadsheet application mapping, and presentation application mapping.

4. The method of claim 1, further comprising receiving control inputs using a touch screen and displaying a document map list as a semi-transparent overlay in the first display portion of the handheld display, wherein the semi-transparent overlay encompasses a portion of the map list items.

5. The method of claim 1, further comprising receiving a control input associated with a selection of the different map list item and generating the preview of content associated with the different map list item in the second display portion adjacently disposed to the first display portion of the handheld display.

6. The method of claim 1, further comprising partitioning a display such that a size of the first display portion is approximately equal to a size of the second display portion.

7. The method of claim 1, further comprising receiving control inputs to navigate using a touch screen and displaying a document map list as a semi-transparent overlay in the first display portion of the handheld display, wherein the semi-transparent overlay encompasses a portion of the map list items.

8. The method of claim 7, further comprising receiving a flick input as part of navigating the map list items.

9. The method of claim 8, further comprising receiving a pan input as part of navigating the map list items.

10. The method of claim 1, further comprising displaying one or more comment symbols associated with a number of comments in conjunction with one or more of the map list items in the first display portion of the handheld display and navigating to a commented portion of the file after selection of a comment.

11. A handheld computing device comprising:
an interactive interface comprising a handheld display having a first defined display area and a second defined display area to receive user input and display information;
a map generator to access a first data structure and provide a second data structure that includes a number of list items comprising textual information, wherein the map generator operates to provide a navigable map that includes the number of list items based in part on a type of application, wherein each list item comprises a textual entry and maps to associated content of the type of application; and
a display manager to display the second data structure including one or more of the number of the list items in the first defined display area of the interactive interface while displaying a preview of information associated with a list item that comprises a textual entry associated with a first portion of a file in the second defined display area of the interactive interface, wherein the display manager is further configured to dynamically update the second defined display area with a preview of a second portion of the file after selection of a different list item and continue to display the one or more of the number of the list items in the first defined display area of the handheld display.

12. The device of claim 11, wherein the interactive interface comprises a touch screen interface.

13. The device of claim 11, wherein the map generator operates to parse the first data structure based in part on the type of application operable with the first data structure.

14. The device of claim 13, wherein the map generator operates to parse the first data structure and provide the list items corresponding to elements of an extensible markup language (XML) data structure and one of a group selected from a word processing application, spreadsheet application, and presentation application.

15. The device of claim 11, further comprising a comment manager to manage comments associated with any of the list items.

16. The device of claim 15, the comment manager further operable to navigate to a commented portion upon receiving input to the interactive interface.

17. A computer readable storage medium which stores executable operations that operate to provide information by:
generating a mapped data structure from an underlying data structure, the mapped data structure including a number of linked list items comprising textual information corresponding to aspects of the underlying data structure, further including generating the mapped data structure of the linked list items based in part on a type of application, wherein each linked list item comprises a textual entry and maps to associated content of the type of application;
presenting one or more of the number of the linked list items comprising textual information of the mapped data structure in a first area of a handheld computer display, the presenting based in part on font parameters of the textual information associated with the underlying data structure;
generating a preview of select information associated with a first portion of a file corresponding with a first linked list item to be displayed in a second area of the handheld computer display while displaying the number of linked list items comprising the textual information in the first area of a handheld computer display;

receiving control inputs regarding interaction with the linked list items; and dynamically updating the second area of the handheld computer display with a preview of a second portion of the file after selecting a second linked list item while displaying the number of linked list items comprising the textual information in the first area of the handheld computer display.

18. The computer readable storage medium of claim 17, the executable operations that operate further to provide information by presenting the preview of the select information in the second area of the handheld computer display adjacent to the linked list items for navigation.

19. The computer readable storage medium of claim 17, the executable operations that operate further to provide information by presenting comments as part of a linked list display.

20. The computer readable storage medium of claim 17, the executable operations that operate further to provide information by using flick, tap, and pan operations as the control inputs to interact with the linked list items.

\* \* \* \* \*